April 25, 1939.   C. H. SMITH   2,156,166
MANHOLE COVER
Filed Dec. 16, 1936   2 Sheets-Sheet 1

INVENTOR.
CHARLES H. SMITH
BY
ATTORNEYS

April 25, 1939.　　　C. H. SMITH　　　2,156,166
MANHOLE COVER
Filed Dec. 16, 1936　　　2 Sheets-Sheet 2

INVENTOR.
CHARLES H. SMITH
BY
ATTORNEYS

Patented Apr. 25, 1939

2,156,166

UNITED STATES PATENT OFFICE 2,156,166

MANHOLE COVER

Charles H. Smith, Cleveland, Ohio

Application December 16, 1936, Serial No. 116,168

2 Claims. (Cl. 220—25)

This invention relates to improvements in manhole covers or the like, and more particularly to manhole covers for high pressure boilers and the method of fabricating the same.

Heretofore manhole covers for boilers or the like have most commonly been manufactured from pressed steel or cast metals. These covers had various disadvantages, the foremost of which is the lack of strength. Cast metals being inherently brittle, covers made from this metal had to be extremely heavy and cumbersome if they were to withstand the strains of the high pressures to which they were subjected. When a cast metal cover fails, it does so suddenly and without warning and such failure is usually accompanied by casualties among the workers in the vicinity.

Pressed steel covers, although generally stronger than cast metal for the amount of weight involved, are, because of the very nature in which they are manufactured, usually weakened at some of the points where the greatest strength is needed. One such a place in particular is at the gasket joint or seat on the manhole where the shear stresses due to internal pressure in the boiler on the cover are the greatest. Although the pressed steel covers may not be subject to sudden failures like the cast metal covers, the metal being weakened at certain points sometimes becomes distorted under excessive pressure loads and the joint then becomes leaky. Furthermore, the seating points where the cover seals with the manhole must, because it is made from pressed steel, be provided with relatively large tolerances to allow for discrepancies in the fabrication. This increase in tolerances of necessity affects the exactness with which the seal can be made, thus impairing the efficiency of the seal. For instance, the gasket seat cannot be definitely defined due to the large radii employed in the corners of the seat.

Furthermore, where the corners occur, such as adjacent the gasket seat, the metal being pressed from a blank of uniform thickness, causes this point to be unduly stretched and stressed, not only weakening the internal structure of the metal, but decreasing the thickness. Thus it is found that a thin section of metal is provided at a place where the greatest shear stresses during operation are applied.

In the present invention, a highly improved manhole cover is provided, being manufactured by a drop forging process. I have found that a cover made by forging inherently has new and unexpected advantages. Drop forging substantially increases the strength of the metal for it has the fibrous qualities of forging and a piling up of the metal at points where shearing stresses are greatest, this being the point where pressed steel covers are thinnest. Forging permits the fibers of the metal to be positioned in a manner that is new and which materially adds to the strength. An examination of the finished product shows that there is an alignment of the fibers in the body of the forging which extends longitudinally. This condition may be thought of as a continuous flow of fibers through the forging from end to end. At the surface it is found that there is a change in the fiber flow; that is the fibers extend at right angles to the fibers in the body, at the bolt lugs. This again furnishes greater strength since the pull of the bolt heads on the internal bolt lugs also normal to the fibers although the fibers at that particular point, in the lug and on the surface, may be considered as crosswise to those in the body. Since the stresses are applied normally to this flow, it is obvious that greater strength is thereby obtained. It also makes it permissible to fabricate the covers with extremely small tolerances, thus assuring extreme accuracy of construction throughout. Furthermore, by this process it is possible to so design and fabricate a cover that the points in the cover where the greatest stresses are applied during operation are materially reinforced and strengthened; that is enough metal is positioned at these points in a new manner so as to withstand the stress at each point and still not have an excess of metal at those points where the smallest stresses occur, thus providing a cover that is lighter in weight, less apt to failure on overloads, and in which distortion occurs before fracture, which distortion may be readily observed before danger of complete failure is eminent.

By the present invention the deficiencies present in the prior art devices have been eliminated. The manhole cover is formed entirely by drop forging and there is provided a thin dome reinforced by a rib. The wall of the dome gradually increases in thickness from the rib or center to the flange where a marked increase in thickness is present and necessary, due to the added strength desired for the resistance to shearing. In other words, the cover is so proportioned as to meet all expected stresses at all points more or less equally except at the flange where greater strength is provided. The connections for the hold-on bolts and yokes are formed integral with the cover, eliminating the necessity of welding the same to the cover.

Still other advantages of the invention and the method of making the same will become more apparent from the following description of an embodiment of the invention, which description is illustrated by the accompanying drawings.

Figure 4:
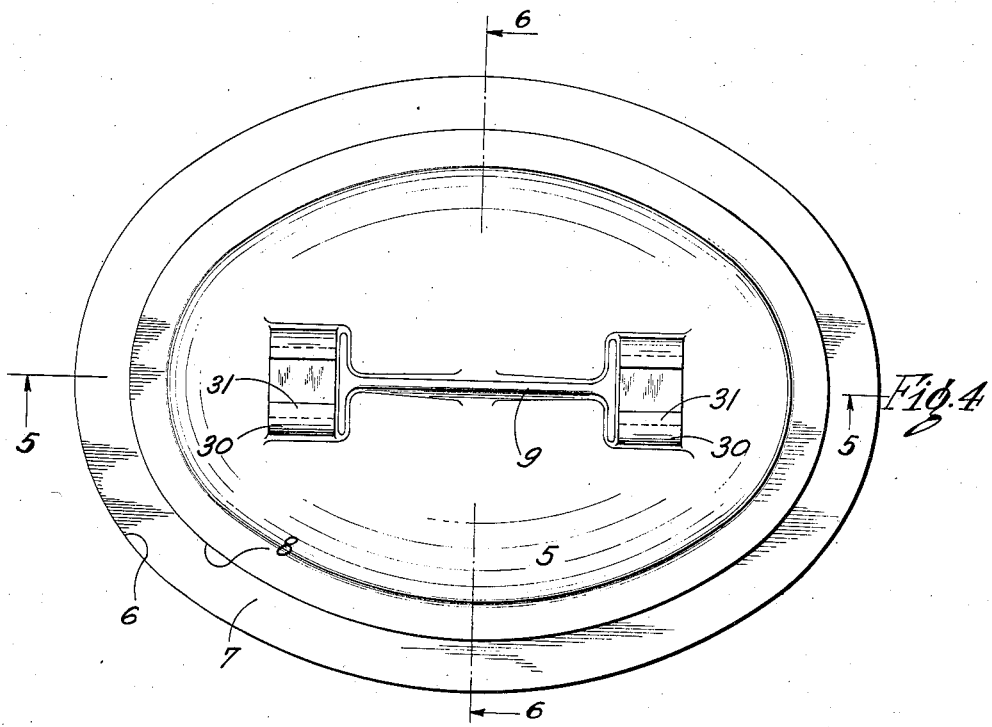
Fig. 4 is a plan view of a modified form of cover.
Figure 5:
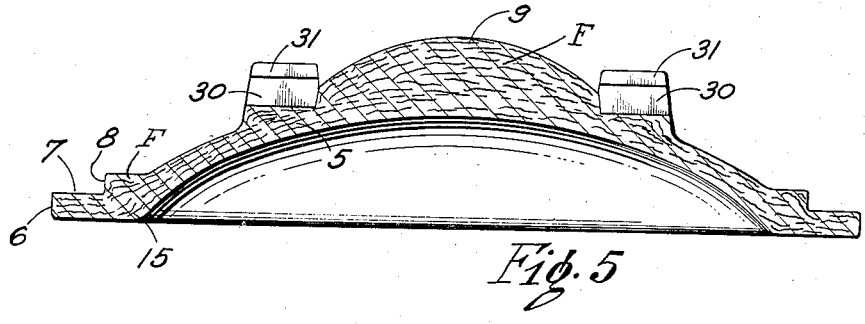
Figure 6:
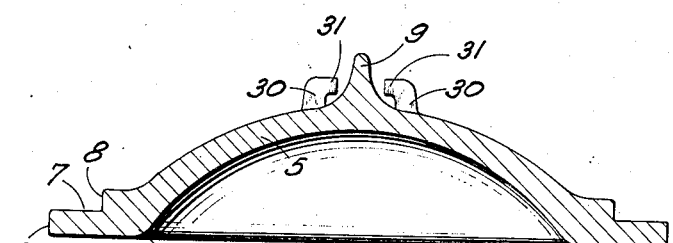

Figs. 5 and 6 are sections taken on the lines 5—5 and 6—6 respectively of Fig. 4.

Referring now to the drawing throughout which like parts have been designated by like reference characters, the head 1 of the boiler is provided with a substantially elliptical manhole opening 2, the material of the boiler head at the opening being turned in to form an integral flange 3, which reinforces the edge of the opening and provides a seat 4 at its extremity for the reception of the manhole cover.

The cover of my invention is of substantially elliptical formation and comprises an outwardly domed concavo-convex body 5, the free edge of which terminates in a peripheral flange 6.

The flange 6 is provided with an annular gasket seat 7 and the body adjacent the seat extends at right angles as at 8 to provide a shoulder bordering the seat. I have found that by the process of manufacture about to be described this seating surface may be so accurately formed during the fabrication as to eliminate the necessity of a machine operation. It may, however, be machined to form a still more accurate seat when so desired.

The outer convex surface of the body is provided with a longitudinally disposed upstanding rib 9 integral with the body and which terminates at each end in a U-shaped socket 10 for the reception of bolt heads. The tops of the sockets have re-entrant walls 11 to engage the heads 12 of the bolts 13, the bolts being insertable through the ends of the sockets which have thus provided a bolt head receiving opening of inverted T-shaped cross section.

Figure 2:
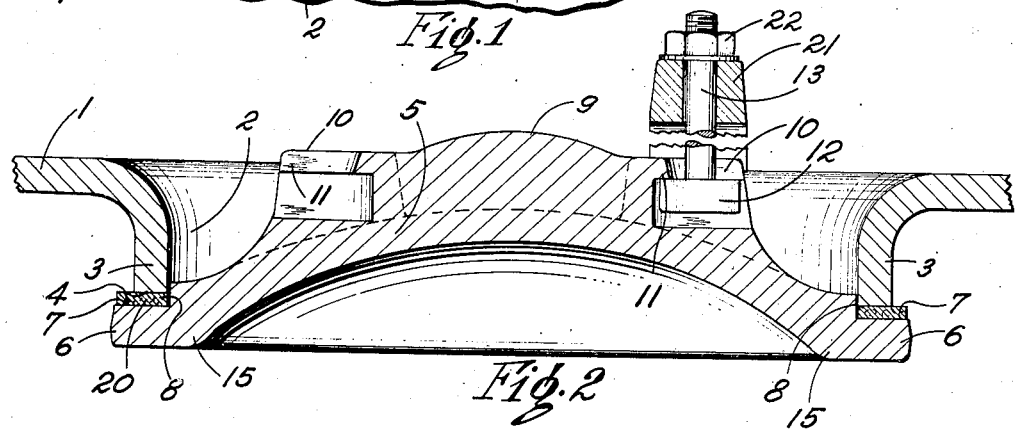
Fig. 2 is a section taken along the line 2—2 of Fig. 1.
Figure 3:
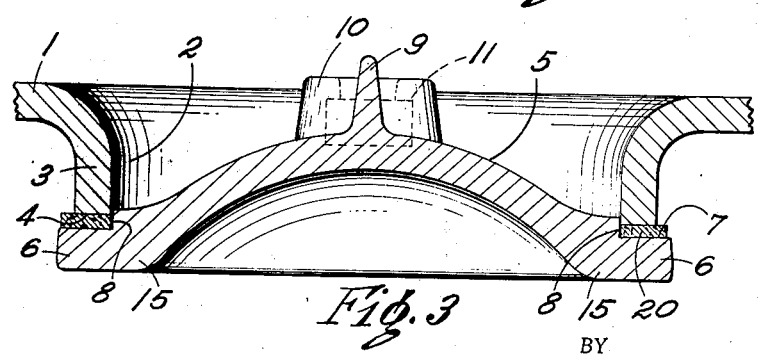
Fig. 3 is a section taken along the line 3—3 of Fig. 1.

It will be noted, as best shown in Figs. 2 and 3, that the thickness of the metal of the dome varies. The thinnest metal being at the apex, where it is strengthened by the rib 9 and gradually increasing in thickness toward the flange 6 at which point 15 it attains the greatest thickness.

Figs. 4 to 6 inclusive illustrate a modified form of the invention. The construction of the cover is substantially the same as that of Figs. 1 to 3 inclusive except for the bolt sockets. In this embodiment the bolt sockets comprise pairs of upwardly extending parallel lugs 30 having their ends 31 turned in toward each other to form a bolt head receiving channel of inverted T-shaped cross section extending longitudinally of the cover.

The covers thus have great strength at the points where the greatest stresses are applied, particularly adjacent the seats, where the metal of the cover is in shear stress from the internal pressure in the boiler on the cover.

The cover is attached to seal the manhole as follows: A gasket 20 is first placed on the seat 7 of the cover where it is held in position by the shoulder 8. The cover is then inserted in the manhole with the convex side facing outward.

The bolt heads are then engaged in the sockets 10 and yokes 21 are disposed over the bolt heads; being held in place by nuts 22 threaded on ends of the bolts. The yokes are also drop forged, being of generally arched formation and of T-shaped cross section. The ends 23 of the yokes bridge the manhole and engage with the face of the boiler. The cover then may be drawn securely into place by tightening the nuts 22 which pull the bolts tight and hold the cover and gasket securely in place on the seat 7 in the usual manner.

Figure 1:
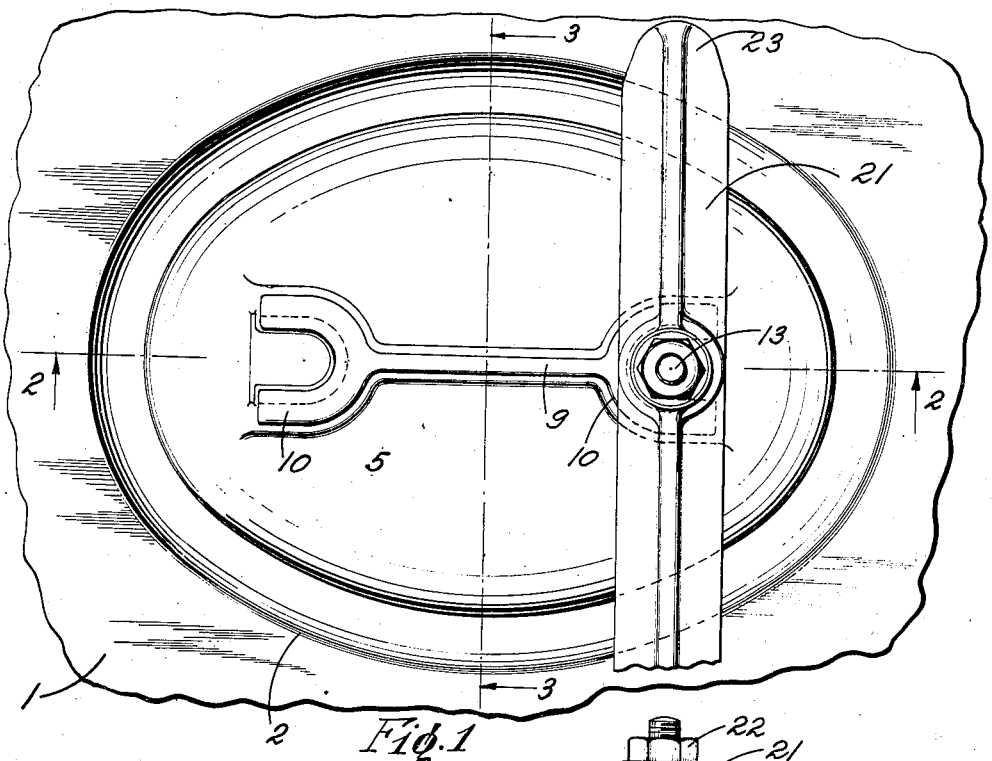
Fig. 1 is a view of a cover in position on a boiler showing one of the cover retaining yokes and bolts, the other yoke and bolt having been removed for clarity.

The method of manufacturing my improved manhole cover is as follows. Billets of steel are provided which are heated gradually to the proper uniform temperature for forging. The billets are then placed between the dies of a drop hammer where they are hammered while hot to the proper formation. In these dies the cover takes its ultimate form except for the bolt sockets which in the embodiment of Figs. 4 to 6 inclusive are at this time merely upstanding lugs. The forging is then taken to a trim press where the flash metal is removed after which the bolt lugs are bent down over a former to provide the socket as shown. In the cover of Figs. 1 to 3 inclusive the bolt lugs after drop forging are merely upstanding U-shaped lugs. These U-shaped lugs are then milled and under-cut to provide a channel of inverted T-shaped cross section. The cover is then permitted to cool, after which they are normalized. They are then cooled in still air, after which all the scale is removed. The gasket seat may then be machined where required.

The billets are so made that they contain fibers which extend longitudinally therethrough. This may be accomplished by using billets which have been rolled into longitudinally extending bars. The bars, as is well known to those versed in the art, have a definite fibrous structure due to elongation of the crystals, which fibers extend longitudinally of the bar. These long bars are severed into lengths which are predetermined and each contains enough metal to allow a complete device to be drop-forged therefrom. They are then placed between the dies with the longitudinal axis of the billet parallel to the longitudinal axis of the dies. After hammering, the finished product is found to have continuous longitudinally extending fibers extending along the longitudinal axis of the cover as best shown by the flow lines F in Fig. 5; these fibers are normal or perpendicular to the shear stresses which may later be applied to the cover and follow the dome-shaped contour thereof. It is to be noted from Fig. 5 that these fibers are at right angles or normal to the direction of stress and hence any force applied to the device is in shear with no opportunity for such forces to find a definite cleavage plane which would cause sudden failure.

It has been mentioned that the top of the dome is the thinnest, while the zone adjacent the gasket seat is strengthened at the greatest point of shear. By this construction, should the cover be subjected to such excessive strains as to distort the same, such distortion will occur at the weaker portions, i. e., the top of the dome being a bulging out, rather than at a place where the seal with the head will be affected; i. e., gasket flange. Therefore the distortion occurs at a point where it may readily be observed and measured. This not only serves as an indicator of the overload, but also permits the devices to be tested accurately for determining the load rating to be applied to certain sizes of covers, making it possible to assure that the rating is well within the safety limits set for such devices.

It will thus be seen that a manhole cover has been designed where the number of operations for constructing the same are reduced to a minimum and where such operations as are had upon the device serve to strengthen rather than weaken the structure. It is not necessary to weld or crimp any bolt holding sockets to the head since they are integral with the device and the head is therefore not weakened at these strategic points. The points where greatest stress occurs are amply strengthened to assure against fracture, and the method of fabrication permits a degree of accuracy to be had that eliminates excessive tolerances that heretofore were common in such devices, permitting the same to be mounted quickly and easily in the boiler manhole. The accuracy of gasket seat permits the gasket to be quickly placed in position and with assurance that once on, it will not slip during the process of assembly, and present an uneven seal with the head. The distribution of metal is such as to assure maximum strength with a minimum amount of metal, eliminating all excess weight and making the same easier to handle.

Having thus described my invention, I am aware that numerous and extensive departures may be made therefrom but without departing from the spirit or scope of the invention.

I claim:

1. A one piece drop forged manhole cover having a dome shaped central wall and a peripheral, gasket receiving marginal flange, the metal connecting the dome wall to the flange being greater in thickness than the central part of the dome wall, the cover having an integral rib extending lengthwise of the dome wall on its outer side and provided with laterally opening bolt receiving sockets.

2. A one piece drop forged manhole cover having a dome shaped central wall and a peripheral, gasket receiving marginal flange, the cover increasing progressively in wall thickness from its central part to the flange and being greatest in thickness at the junction of the dome wall and flange, the cover having an integral rib extending lengthwise of the dome on its outer side and provided with laterally opening bolt receiving sockets at its ends.

CHARLES H. SMITH.